Dec. 14, 1954  P. A. GROBEY  2,696,986
WORK-HOLDING MECHANISM
Filed July 29, 1952  3 Sheets-Sheet 1
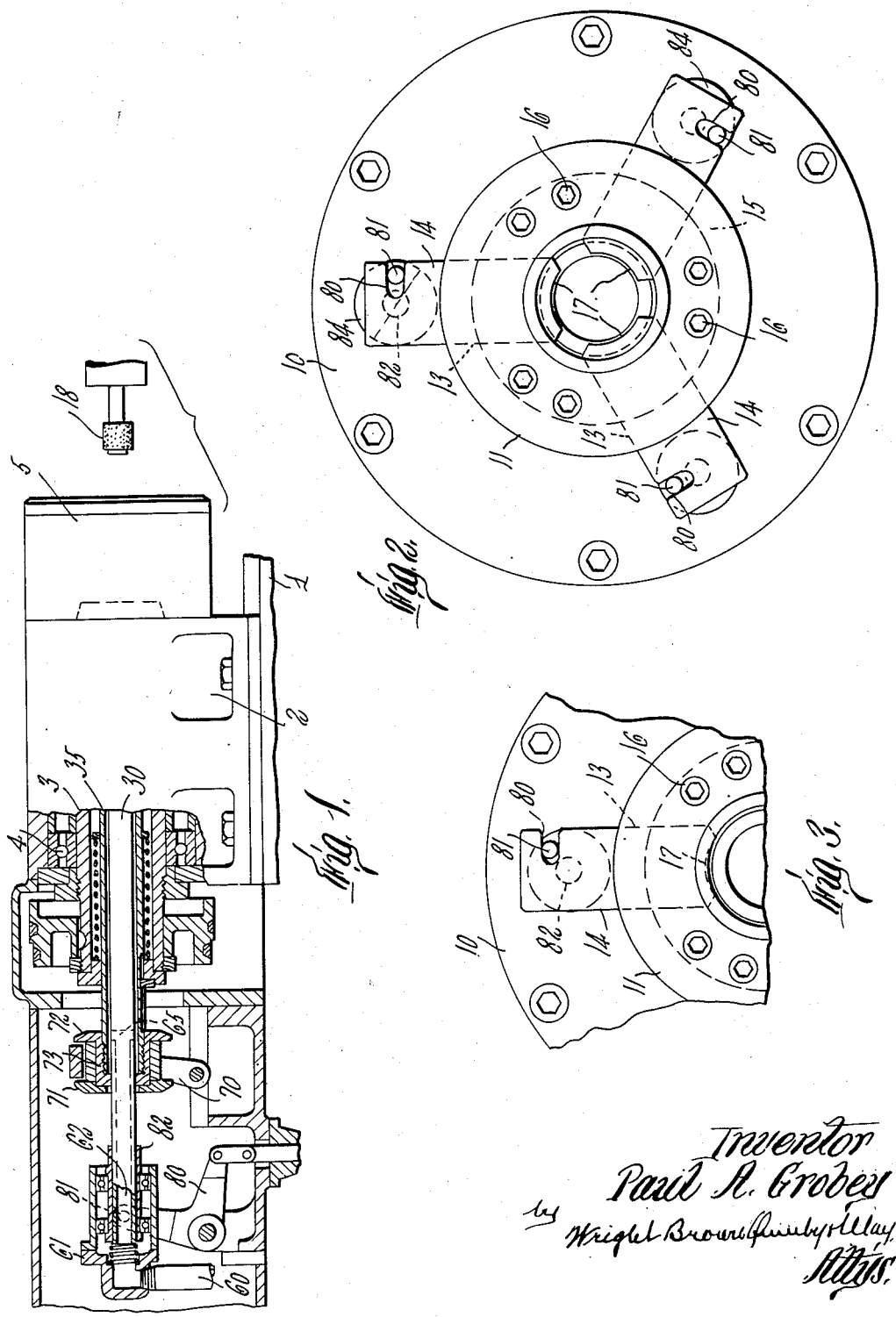
Inventor
Paul A. Grobey
by Wright, Brown, Quinby & May
Attys.

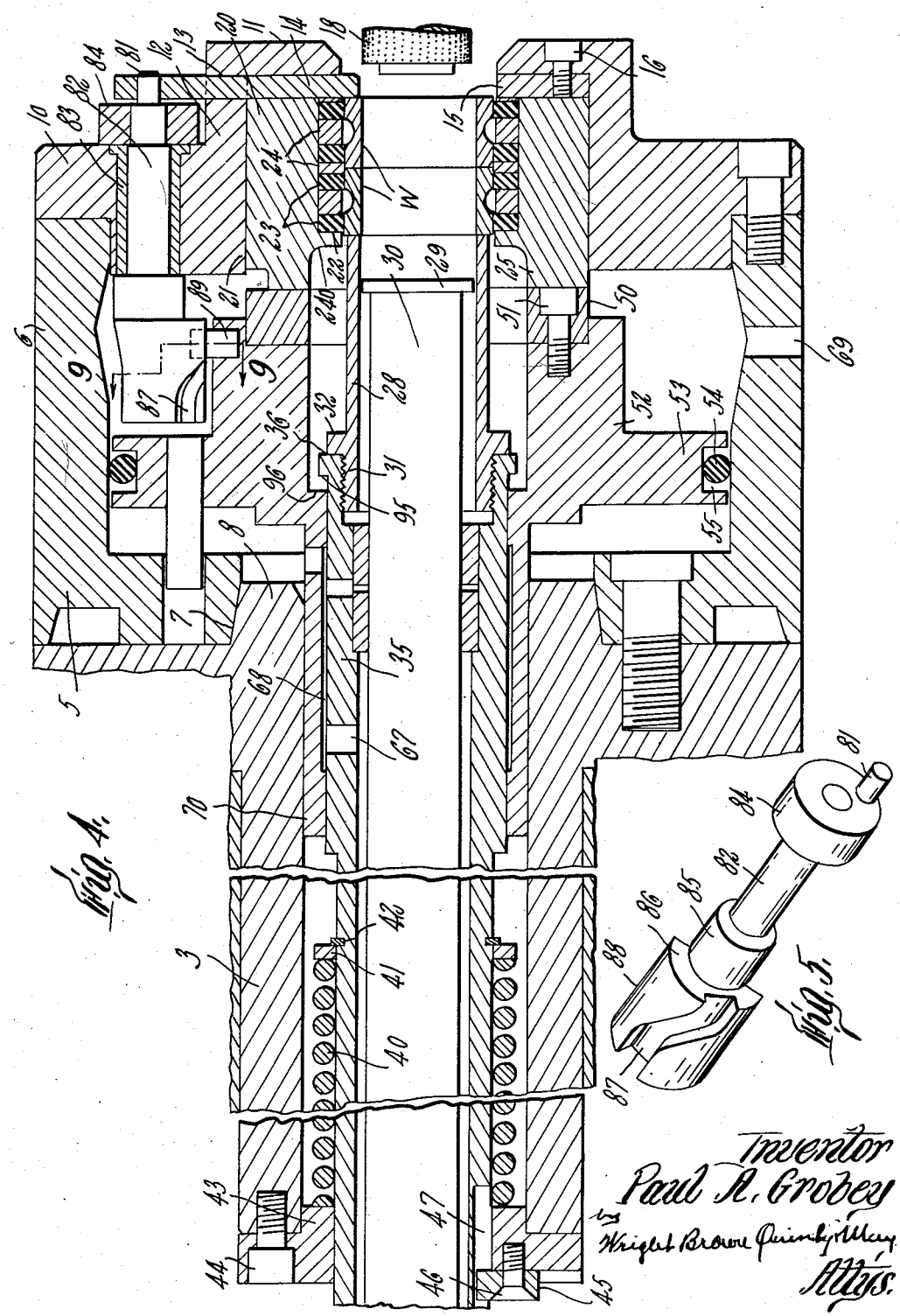

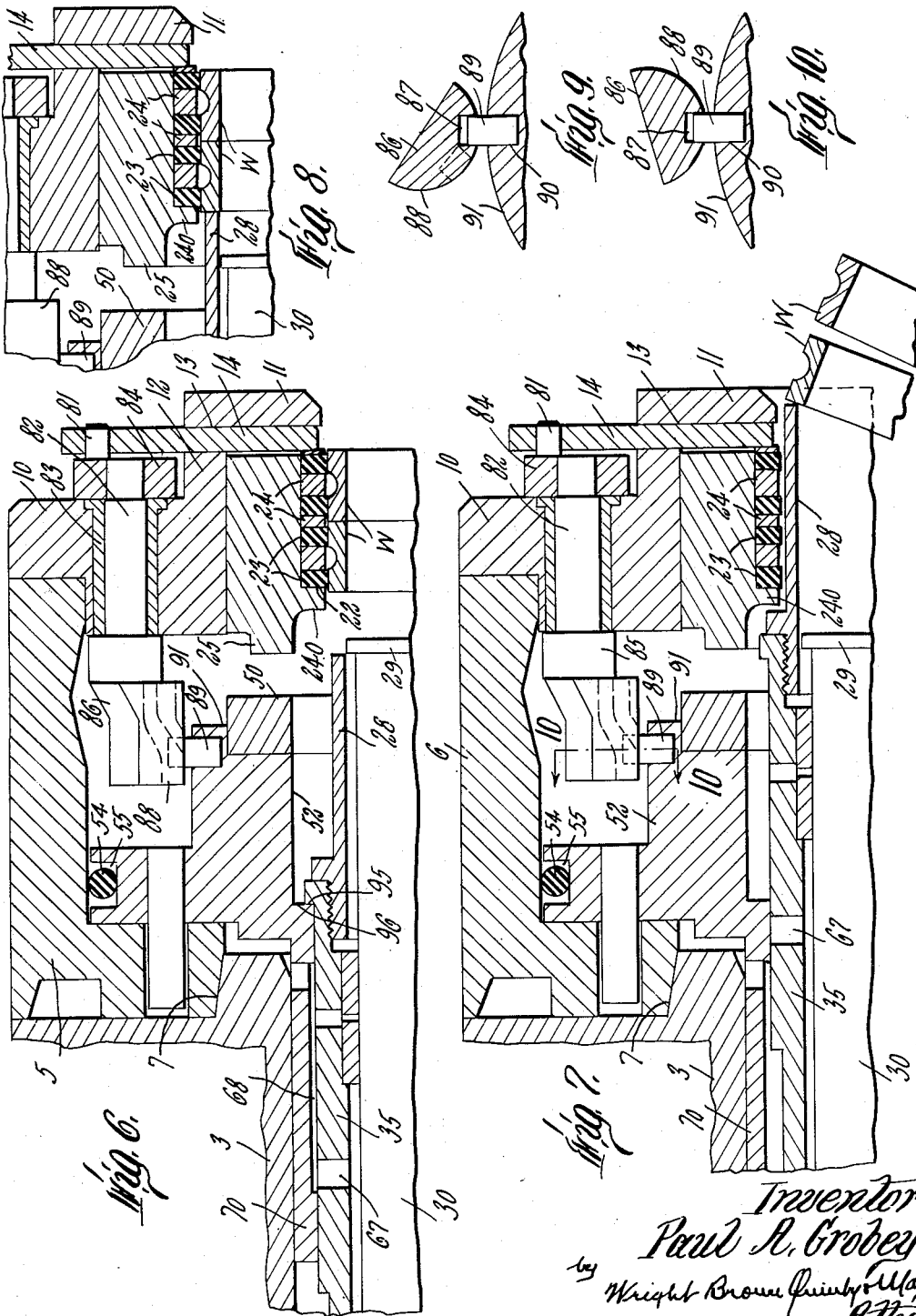

United States Patent Office 2,696,986
Patented Dec. 14, 1954

2,696,986

WORK-HOLDING MECHANISM

Paul A. Grobey, Springfield, Vt., assignor to Bryant Chucking Grinder Company, Springfield, Vt., a corporation of Vermont Application July 29, 1952, Serial No. 301,538

6 Claims. (Cl. 279—4)

This invention relates to mechanism for holding cylindrical work pieces, and particularly a plurality of work pieces, at one time, and has for an object to center the work piece or pieces from their outer peripheries and to clamp them endwise.

A further object is to produce the centering by axial compression of members deformable to exert radial pressure on the work.

A further object is to provide retractible members engageable with the outer end face of the work piece or pieces and against which the work is pressed by means which when the members are retracted serves to eject the work.

Further objects and advantages will appear from a description of an embodiment of the invention shown in the accompanying drawings in which Figure 1 is a fragmentary view partly in side elevation and partly broken away and in section of a grinding machine headstock embodying the invention and showing a portion of the grinding wheel head.

Figure 2 is a front end elevation of the work holder or chuck to a larger scale and with the parts in work-clamping positions.

Figure 3 is a fragmentary view similar to a portion of Figure 2, but showing the chuck open.

Figure 4 is a central longitudinal sectional view to a larger scale through the chuck and related parts, and showing a plurality of work pieces clamped therein.

Figure 5 is an isometric view of a portion of the chuck opening and closing mechanism.

Figures 6, 7 and 8 are fragmentary views similar to portions of Figure 4 but showing the chuck open and prior to and as the work is being ejected and being loaded, respectively.

Figure 9 is a detail sectional view on line 9—9 of Figure 4.

Figure 10 is a detail sectional view on line 10—10 of Figure 7.

Referring first to Figures 1, 4 and 6, at 1 is indicated the bed of a grinding machine carrying a headstock 2 in which is journaled a rotary spindle 3, one set of bearings for this spindle being shown at 4 in Figure 1. At the forward end of this spindle is secured a chuck 5, the construction of which is best shown in Figures 4, 6, 7 and 8. This chuck comprises a rear body portion 6 having its rear face centrally recessed at 7 to engage over and be secured to a standard spindle nose at 8 on the work spindle 3.

The body 6 is hollow and its outer end is partly closed off by a cover plate 10. This cover plate 10 is provided with a forward tubular extension 12 having an in-turned forward flange 11 and its portion 12 is provided with radial slots 13 therethrough for the slidable reception of a plurality of jaws 14, three such equi-angularly spaced jaws being shown in Figure 2. These jaws are slidable substantially radially and in a plane transverse to the axis of rotation of the spindle 3 and the chuck body between segmental filler pieces 15 which may be secured to the rear face of the flange 11 as by the screws 16.

The inner ends of the jaws 14 are preferably of arcuate contour as shown at 17 in Figures 2 and 3, and may project partly over the outer ends of work pieces W, two of which are shown arranged end to end within a ring member 20 and with their interiors accessible for machining by the rotary grinding wheel 18. This ring member is axially slidable within the tubular portion 21. Its inner face is provided with a tubular socket 22 within which may be arranged alternately a series of rings 23 and 24. The rings 24 are preferably metal, but the rings 23 are of deformable material such as rubber, and the total length occupied by the rings 23 and 24 when the rings 23 are uncompressed, is slightly greater than the distance between the outer end of the ring member 20 and an annular shoulder 24θ which forms the abutment for the innermost ring 23. The work pieces as shown are the internal raceways of ball bearings, each having a central peripheral ball-receiving groove. As shown there are two rings 23 engaging with each work piece one on either side of the ball groove. When the rings 23 are uncompressed, the forward face of the member 20 is spaced inwardly from the inner faces of the jaws 14 as shown in Figures 6, 7 and 8, but by exerting pressure against an annular extension 25, this member 20 may be forced forwardly, pressing the rings 23 axially and causing them to be deformed radially so that their inner faces are pressed against the outer faces of the work pieces W, thus centering these work pieces from their outer peripheral surfaces. The member 20 and jaws 14 thus provide relatively movable members movable to compress or release the rings 23 axially. When the jaws 14 are in their inward positions, as shown in Figure 4, these jaws project radially inwardly of the outer face of the outer work piece W and limit the axial positions of the work pieces outwardly.

The work pieces may be clamped against the rear faces of the jaws 14 by a tubular member 28. This tubular member 28 has not only the function of clamping the work pieces axially, but it also acts at suitable times as a stop to limit the insertion of work pieces and at other times as an ejector to move the work pieces out from the chuck when the jaws 14 have been withdrawn, as will later more fully appear.

The head 29 of a size gage 30 slidable within the member 28 may be periodically pressed toward the rear faces of the work pieces, as is well known in the art, so that when the interior of the work pieces have been brought to a predetermined size, as by the action of the grinding wheel 18, the gage can enter thereinto.

The combined stop, clamp and ejector 28, as shown, is provided with a threaded rear extremity 31 to the rear of an annular shoulder 32 and this threaded portion 31 is engaged in the mating threaded portion at the forward end of an actuating sleeve 35, a shoulder 36 on this sleeve acting as an abutment to limit the threaded engagement between the sleeve and the clamping and ejecting member 28. This sleeve 35 may be pressed forwardly so that the member 28 engages the rear face of the rearward work piece and presses the work piece or pieces against the jaws 14 as shown in Figure 4 as by the action of a spring 40 surrounding the sleeve 35, and engaging a ring 41 held against forward movement, as by a snap ring 42 seated in a peripheral groove in the sleeve 35. The rear end of the spring 40 bears against the forward end of an abutment ring 43 secured to the rear end of the spindle 3 as by screws 44. The sleeve 35 is keyed to the spindle as by a key 45 which is secured to the ring 43 as by a screw 46 and engages in the longitudinal groove 47 in the outer face of the sleeve 35.

The ring member 20 is pressed axially forwardly to compress the deformable rings 23 and center and clamp the work pieces, by fluid pressure, as pneumatically. To this end a ring 50 bears against the annular portion 25 of the ring member 20, this ring 50 being secured as by screws 51 to the forward reduced diameter portion 52 of an annular piston 53. This annular piston is axially slidable within the rear portion of the body 6, and there may be a packing ring 54 in a peripheral groove 55 in the piston 53 engageable with the inner wall of the body 6.

The rear face of the piston 53 may be acted upon by fluid pressure which may be introduced through a pipe 60 (see Figure 1) into an axially movable but non-rotatable packing gland 61 from which it finds its way through a central opening 62 in the rear portion of the gage member 30. The air escapes from the forward end of the bore 62 through lateral openings 65 into a space between the outer face of the gage 30 and the inner wall of the sleeve 35. It then passes through one or more lateral openings 67 through the sleeve 35 into an annular space 68 between this sleeve 35 and a rear tubular extension 70 of the piston 53. When fluid pressure is introduced in this manner, it passes between the rear face of the piston 53 and the forward face of the spindle 3 and forces the piston 53 outwardly, pressing the ring 50 against the rear end of the tubular member 20 and forcing it toward the jaws 14 and segmental pieces 15, thus compressing the deformable rings 23 and centering and clamping the work piece or pieces radially. At the same time the work is clamped axially by the sleeve 28 which presses the work piece or pieces axially against the rear faces of the jaws 14 under pressure exerted by the spring 40. An open port 69 through the body vents the space forwardly of the piston 53.

The member 28 may also be given a motion in addition to that exerted by the spring 40 when it is desired to eject the work pieces, and this may be done by the rocking, as by cam means not shown herein, but which may be as illustrated in my application for Letters Patent Serial No. 111,779 filed August 23, 1949, for Internal Grinding Machine, acting upon an arm 70 having a forked portion engaging between the heads 71 and 72 of a spool member 73 secured to the rear end of the sleeve 35 as shown best in Figure 1. The work gage 30 may also be given its usual reciprocating motion and this may be done through the rocking of a bell crank lever 80 having one arm 81 pivotally connected to the gland 61 within which the gage 30 is journaled but is axially fixed. This bell crank lever 80 may be rocked by cam mechanism not shown herein, but which may be as shown in the Ljunggren Patent No. 2,502,862 granted April 4, 1950.

When the fluid pressure is introduced back of the piston 53 to effect clamping of the work pieces and is moved forward, this forward motion first acts to move the jaws 14 into position to take the thrust from the element 28. It will be noted that the jaws 14 are slidable radially. The outer end portion of each of the jaws 14 is provided with a slot 80, as shown best in Figures 2 and 3, within which rides a pin 81 eccentrically disposed to a shaft 82 journaled in a bushing 83 extending through the cover plate 10.

Referring particularly to Figure 5, this shaft 82 has secured to its forward end a collar 84 which carries the pin 81, and back of the bushing 83 it is provided with an enlarged diameter portion 85 back of which is a segmental cam member 86 provided with a cam groove 87 in its arcuate face 88. Within this cam groove 87 rides a pin follower 89 seated in a socket 90 in the periphery of a reduced portion 91 of the piston 53. The cam groove 87 is so shaped that as the piston 53 is advanced or moved toward the jaws 14, the shaft 82 is rocked from the angular position shown in Figures 3 and 6 to the angular position shown in Figures 2 and 4, and this causes the pins 81 riding in the slots 80 to move the jaws 14 from their retracted positions of Figures 3 and 6 to their projected positions of Figures 2 and 4, where they project over the forward face of the outer work piece and present an abutment against which the work pieces are forced by the member 28.

Retraction of the sleeve 35 brings an annular shoulder 95 against a mating shoulder 96 on the piston 53, whereupon further withdrawal of the member 28 withdraws the piston and returns it to its starting position, withdrawing the jaws 14 from their work-obstructing position of Figure 4, and freeing the work pieces so that the next forward motion of the member 28 by rocking of the arm 70 will serve to eject the work pieces from the chuck, as shown in Figure 7.

Operation

When the work is to be loaded, the ejector 28 is positioned just back of the position of Figures 1 and 4 in the position of Figure 8 with its forward end so positioned as to be contacted by the inner work piece to be loaded. The piston 53 has been fully retracted by previous full retraction of the ejector so that the axial pressure on the rings 23 has been released, and the jaws are retracted. The work pieces are then loaded from the forward end of the chuck, being pushed back from the forward end to the ejector 28, as shown in Figure 8. Fluid pressure is then admitted back of the piston 53 which forces it forwardly and closes the jaws 14. The fluid pressure is then discharged but the ejector is not pulled back so that the jaws remain closed. The arm 70 is then released for clockwise angular motion so that the spring 40 is permitted to load the ejector to press the work pieces against the rear faces of the jaws 14. Fluid pressure is then again admitted back of the piston 53, driving it forwardly to press against the tubular member 20, deforming and closing the rings 23 against the outer faces of the work pieces. Instead of applying the radial and axial clamping forces successively as described, it is also possible to apply them simultaneously, if desired. The apparatus is now in grinding condition and is so held until the end of the grinding operation, which is done by the wheel 18.

The plug gage 30 is reciprocated in time with the reciprocation of the grinding wheel until such time that its head enters the ground hole in the work, whereupon the grinding is stopped, as is well known in the art, and the work is unloaded. This unloading is done by first discharging the fluid pressure back of the piston 53 and then pulling back the ejector 28. The pulling back of the ejector 28 releases the radial pressure of the rings 23 from the work and it also engages and pulls back the piston 53 which retracts the jaws 20. The ejector 28 is then pushed forwardly by swinging the arm 70 in clockwise direction, the ejector then being driven to the position of Figure 7, ejecting the work pieces, after which it is retracted to the position of Figure 8 and there held until after the next work pieces to be ground have been inserted into the chuck.

From the foregoing description of an embodiment of this invention it should be evident to those skilled in the art that various changes and modifications may be made without departing from its spirit or scope.

I claim:

1. A work holding chuck comprising a tubular member, a ring of deformable material enclosed by said tubular member and within which a work piece may be placed, a member movable across one end of said tubular member and between a position obstructing the removal of the work piece from that end of said tubular member and a retracted nonobstructing position, and means operatively engaging the face of said ring opposite to said movable member and actuable to press said ring against said movable member when said movable member is in obstructing position to deform said ring to engage and center the work from the outer face of the work.

2. A work holding chuck comprising a tubular member, a ring of deformable material enclosed by said tubular member and within which a work piece may be placed, a member movable across one end of said tubular member and between a position obstructing the removal of the work piece from that end of said tubular member and a retracted nonobstructing position, means operatively engaging the face of said ring opposite to said movable member and actuable to press said ring against said movable member when said movable member is in obstructing position to deform said ring to engage and center the work from the outer face of the work, a clamp member operatively engageable with the opposite end face of the work piece, and means actuable to press said clamp against the work piece to press the work piece against said movable member when said movable member is in obstructing position.

3. A work holding chuck comprising a tubular member, a ring of deformable material enclosed by said tubular member and within which a work piece may be placed, a member movable across one end of said tubular member between a position obstructing the removal of the work piece from that end of said tubular member and a retracted non-obstructing position, a clamping member operatively engageable with the opposite end face of the work piece, means actuating said clamping member to press the work piece against said movable member when said movable member is in obstructing position and actuable to eject the work from within said ring when said movable member is retracted, and means operatively engaging the face of said ring opposite to said movable member and actuable to deform said ring against said movable member and cause its inner face to engage and center the work from the outer face of the work.

4. A work holding chuck comprising a body, means carried by said body supporting work from its peripheral face, jaws slidably guided by said body in a plane and radial to and from a position overlying the outer end of the work and obstructing removal of the work, means carried by and movable axially of said body and operatively connected to said jaws for moving said jaws from and to said positions, and means carried by said body and operatively connected to said axially movable means clamping the work radially when said jaws are in said positions.

5. A work holding chuck comprising a body, means carried by said body supporting work from its outer face, jaws slidably guided by said body in a plane and substantially radially to and from positions overlying the end of the work, means carried by and movable axially of said body, a shaft journaled in said body adjacent to each of said jaws and having an eccentric portion operatively connected to the corresponding jaws and moving said jaws from and to said position by rocking of said shaft, a cam carried by each shaft, and a follower for said cam carried by said axially movable member, said cams being shaped to cause such axial movement to rock said shafts, and means for moving said axially movable member.

6. A work holding chuck comprising a body, means carried by said body supporting work from its outer face, said means including a ring of deformable material within which the work is positioned, means for compressing said ring axially to thereby deform it and press it radially against the outer face of said work, said compressing means including a piston movable axially in said body, a member in said body with which the end of the work may be engaged movable to eject the work from said supporting means and to be retracted, means interconnected between said piston and ejecting member causing the retraction of said ejecting member to retract said piston, and means for subjecting one side of said piston to fluid pressure in a direction to compress said ring.

References Cited in the file of this patent

UNITED STATES PATENTS

| Number | Name | Date |
|---|---|---|
| 753,275 | Johnson | Mar. 1, 1904 |
| 1,476,434 | Weibull | Dec. 4, 1923 |
| 1,881,905 | Page et al. | Oct. 11, 1932 |
| 2,469,198 | La Pointe | May 3, 1949 |
| 2,502,862 | Ljunggren | Apr. 4, 1950 |
| 2,546,326 | Wetzel | Mar. 27, 1951 |
| 2,597,712 | Drissner | May 20, 1952 |
| 2,660,440 | Kurtz | Nov. 24, 1953 |